Oct. 26, 1926.
L. SAUNION
1,604,535
BRAKE DEVICE FOR THE FRONT WHEEL OF ROAD VEHICLES
Filed August 28, 1923     4 Sheets-Sheet 1
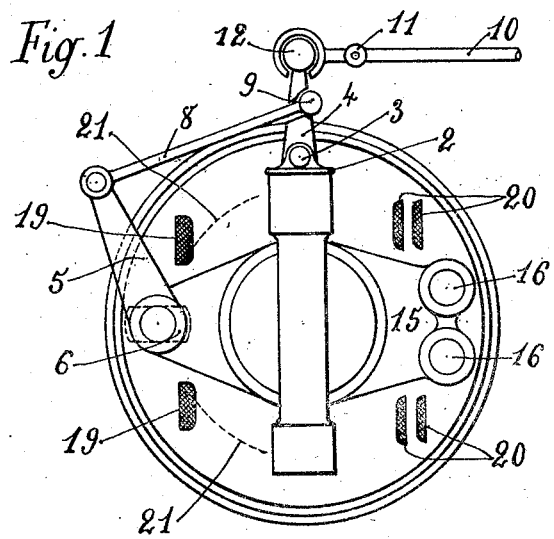
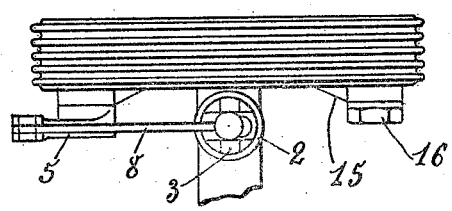
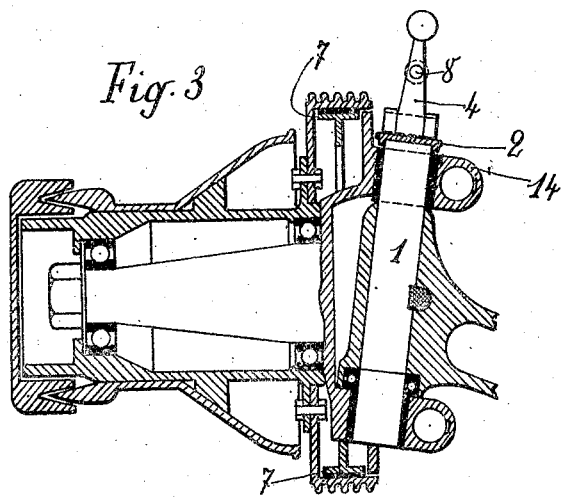
Inventor
Lucien Saunion
Edgar T. Brandenburg
attorney Oct. 26, 1926. 1,604,535
L. SAUNION
BRAKE DEVICE FOR THE FRONT WHEEL OF ROAD VEHICLES
Filed August 28, 1923   4 Sheets-Sheet 2
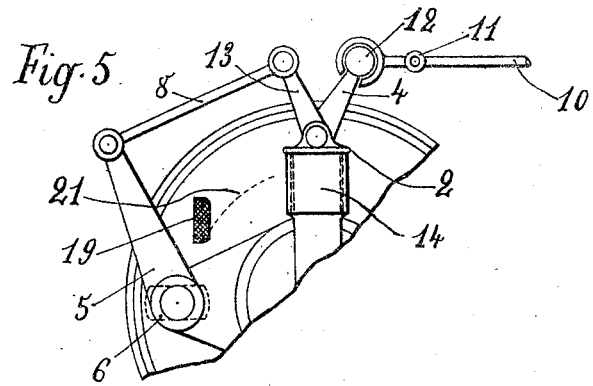
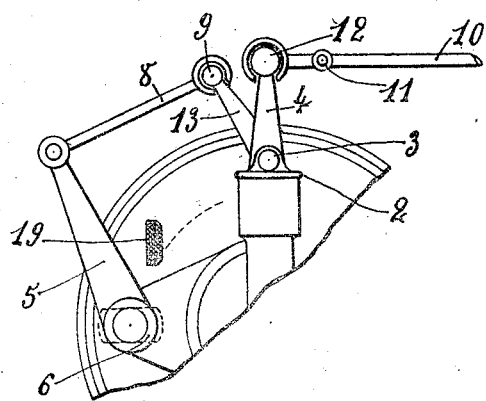
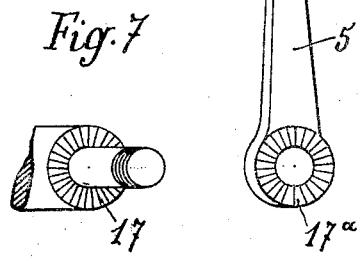
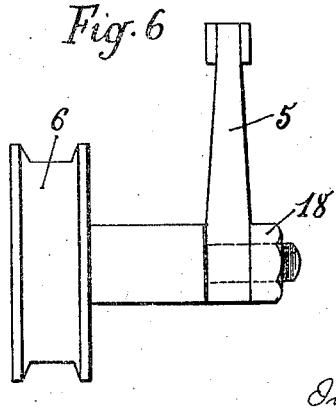
Inventor
Lucien Saunion
Edgar J. Brandenburg
attorney Oct. 26, 1926. 1,604,535
L. SAUNION
BRAKE DEVICE FOR THE FRONT WHEEL OF ROAD VEHICLES
Filed August 28, 1923 4 Sheets-Sheet 3
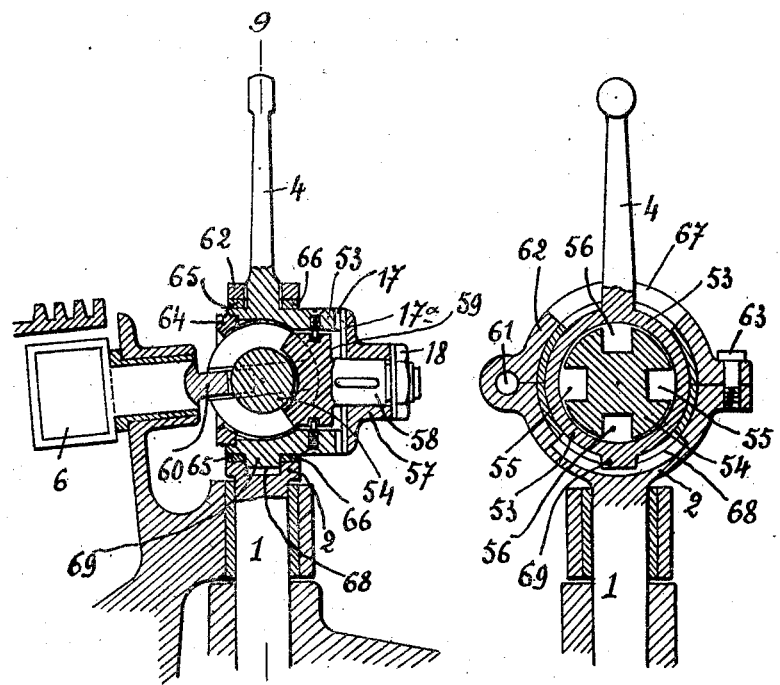

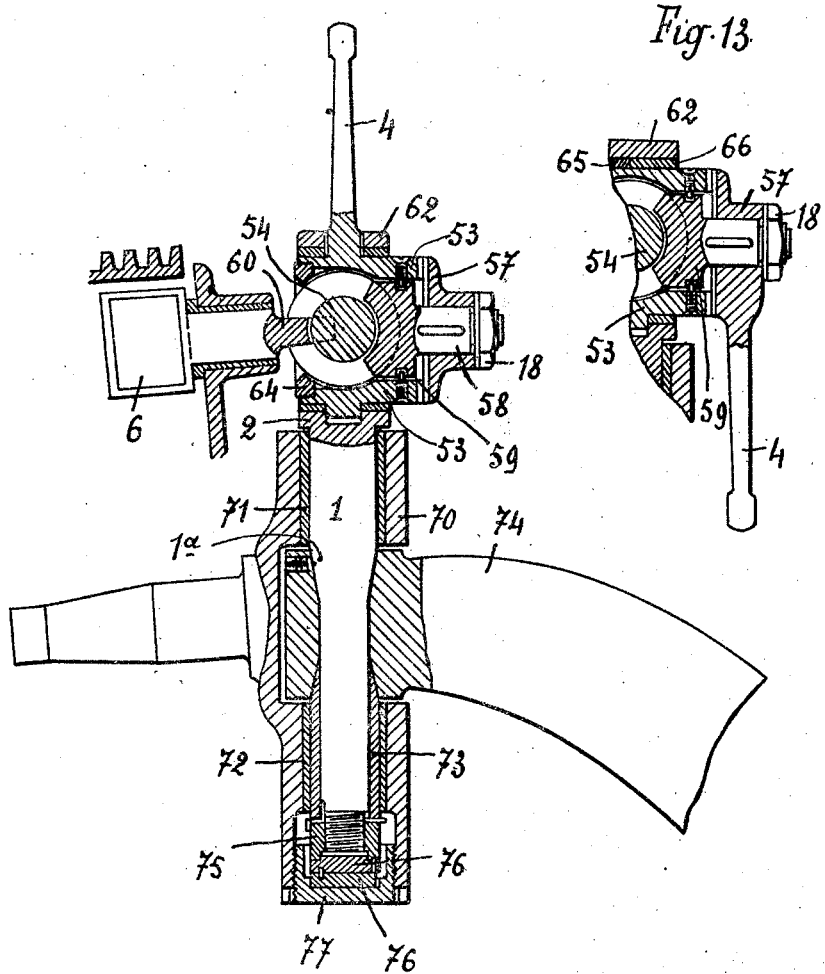

Patented Oct. 26, 1926.

1,604,535

UNITED STATES PATENT OFFICE.

LUCIEN SAUNION, OF PARIS, FRANCE.

BRAKE DEVICE FOR THE FRONT WHEEL OF ROAD VEHICLES.

Application filed August 28, 1923. Serial No. 659,793.

This invention relates to the braking of the front wheels of road vehicles and more especially of motor cars. The object of the invention is to control the brake jaws by means of a device having no counteraction upon the steering, and such that its action upon the wheels is automatically balanced and constant whatever the angle of steering of the wheels may be.

To this effect, the drive of the levers of the expanding cam takes its bearing point upon the axle of the steering device. The length of the drive is thus constant and necessarily unvarying, any point of said axle being a fixed point relatively to the whole of the brake device in any and all the directions that the wheel may possibly take.

According to this invention, the device is characterized by a system of levers the action of which ensures under all circumstances, the normal drive of the expanding cam of the brake jaws. These levers may be mounted immediately upon the axle of the steering device thus allowing by means of a ball joint, the varying direction of the driving lever upon the expanding cam. Alternately these levers may be arranged so as to be able to turn upon said axle simultaneously with the wheels in order to remain always parallel to the same and to the brake drums.

The annexed drawings show by way of examples several forms of execution of the invention.

Fig. 1 is a side view of a braking device according to the present invention in which the driving lever of the cam is made integral with the axle of the steering device.

Fig. 2 is a plan view and Fig. 3 a longitudinal sectional view.

Fig. 4 is a part elevation of a similar device showing another form of construction of the driving levers.

Fig. 5 is a similar view of a modification in which the driving levers are formed with the wheel and the brake drum.

Fig. 6 is a detail view, showing a preferred mode of mounting the lever of the expanding cam of the brake jaws.

Fig. 7 is a perspective view of the end of the cam axle, and Fig. 8 is a similar view of the lever.

Fig. 9 is a longitudinal sectional view of a modification of which Fig. 10 is a sectional view on line 9—9.

Fig. 11 is a detail view.

Fig. 12 is a view of the device mounted upon a compensating steering axle.

Fig. 13 is a detail view of a modified form.

In the form of execution shown in Figs. 1 to 3, upon the axle 1 of the steering device is mounted a small plate or cap 2 rigid with said axle, and provided with lugs in which is journalled a shaft 3 upon which is pivoted a driving finger or lever 4 which is thus fixed relatively to the directions of the wheel. This lever controls the lever 5 of the expanding cam 6 of the jaws 7 by means of a small connecting rod 8 having at its extremity, a ball-and-socket connection with finger 4, the latter being actuated by means of a stem 10 made integral with the compensating bar not shown. Said stem 10 is provided with a pivotal joint 11 and a swivel cap 12, the whole of this device allowing the play of the driving gear in any position of the wheel both in its vertical and steering movements.

Fig. 4 shows a similar arrangement in which the driving finger 4 is made integral with a second lever 13 connected to the small connecting rod 8 by means of a ball joint 9.

In the form of execution shown in Fig. 5, the small plate 2 is made integral with the steering collar 14 with which it rotates simultaneously with the wheel upon axle 1; it carries also the fingers 4 and 13 connected the first with stem 10 by means of joint 11 and swivel cap 12, and the other with connecting rod 8 by an ordinary pivotal joint.

These levers can be driven at will by means of stem or wires and their control will be effected by means of differential tension devices.

Figs. 6, 7 and 8 show a form of construction by means of which the angle of inclination of the expanding cam may be regulated at will. To this end the collar of the axle of said cam is provided with a series of radial notches 17, and the hub of shaft 5 is also provided with a series of corresponding notches 17ª which can engage with the former in any desired angular position. A nut 18 screwed upon the end of the axle maintains the whole assembled together.

The brake jaws move in drums closed by means of cheeks and are thus enclosed in a sort of casing. Consequently, it is necessary to provide for their rapid cooling as they are liable to become very hot. To this end besides the usual arrangement which consists in providing cooling ribs on the exterior of the drums, a circulation of air may be advantageously formed upon the jaws in the interior of the brake by providing air holes 19 suitably facing the road, and outlets 20 at the back of the drums as shown in Fig. 1. These openings are protected by wire grids which prevents the mud getting inside the drums. Moreover, interior ribs, such as 21, Fig. 1, or other deviating means may be provided for properly directing the air upon the jaws in order to enhance their cooling.

In the form of execution shown Figs. 9 to 11, the finger 4 is made integral with a circular bored sleeve 53 in which is placed a ball 54 provided with two pairs of perpendicular grooves 55, 56, as shown in Fig. 11. The sleeve 53 is provided at its end with an undercut surface 17 engaging with the opposite undercut face $17^a$ of a cap 57 keyed upon a short axle 58 and tightly applied against sleeve 53 by means of a nut 18. The axle 58 is connected with a cylindrical part 59, connected to a circular rib engaging the groove 56 of the ball joint 54. The axle of the expanding cam 6 of the brake jaws is provided with a fork 60, the arms of the latter entering the grooves 55 of the ball joint 54.

The steering axle 1 is provided at its end with a semi-cylindrical head 2, upon which is connected for instance by means of hinge 61 an upper half cap 62, the same being tightly applied upon the lower cap 2 by means of a screw 63. These two caps 2 and 62 surround the ball joint 54 which is maintained inside by means of a bearing ring 64. Bearings 65, 66 are preferably arranged between the caps 2 and 62 and the ball joint 54. Grooves 67, 68 are formed in cap 62 to allow the movement of finger 4 and in the lower cap 2 to allow the passage of the lower rib 69 of sleeve 53.

It will be understood that owing to the present device, the movement of the finger 4 and of sleeve 53 to which it is connected will produce, by means of the cap 57, the ball joint 54 and the fork 60 the rotation of cam 6, and, consequently the application of the brake the interposition of the ball joint ensuring in all circumstances absolute freedom of the drive.

The opposite undercut faces 17, $17^a$ of parts 53 and 57 allow the regulating of the initial inclination of the expanding cam 6 and consequently of the action of the brake.

In the form of execution shown in Fig. 12, the arrangement of the brake operating mechanism is the same but in this case the steering axle 1 is provided with a regulating device adapted to compensate the wear chiefly produced by the action of the brake. In the present case the axle 1 which is provided with a conical bearing $1^a$ bearing upon a corresponding surface of the car axle head 74 is mounted in a fork 70, by means of bearings 71, 72; the lower part of the axle 1 engages in a regulating sleeve 73 the upper conical end of which engages with the conical bore of the head of the car axle 74. The regulating sleeve 73 bears upon a nut 75 which is screwed upon the threaded part of axle 1 and is provided with a metal bushing 76 bearing upon a nut cap 77 screwed in the lower end of fork 70. The screwing in of said cap will thus effect the relative movement of the regulating sleeve and of the steering axle adapted to compensate the play which the latter might acquire by reason of repeated braking strains.

Fig. 13 shows a modified arrangement of the driving finger 4. In this case the latter is made integral with the notched cap 57 and is situated in parallel with the steering axle 1. It will be seen that the drive on the expanding cam is obtained here immediately by means of part 59 and ball joint 54. This arrangement has the advantage of bringing the car axle nearer to the driving mechanism of finger 4, in order to reduce as much as possible the varying lengths which said driving mechanism may acquire through the vibrations of the car axle.

Having now declared and ascertained the nature of my invention and in what manner the same is to be performed, I declare that what I claim is:—

A brake device for the front wheels of road vehicles comprising: a brake drum supported on the wheel; a stationary plate; two brake jaws pivoted upon said plate; an expanding cam adapted to expand said jaws; a steering axle with conical bearing connected to said plate; a movable cone engaging the conical bearing on steering axle; a driving finger for the brake; means for supporting said brake on the upper end of the steering axle; connecting means freely pivoted between the finger and the support and between the latter and the expanding part; and means for actuating the driving finger.

In testimony whereof I affix my signature.

LUCIEN SAUNION.